United States Patent [19]
Tamura et al.

[11] Patent Number: 5,517,333
[45] Date of Patent: May 14, 1996

[54] GRADATION CORRECTION DEVICE AND IMAGE SENSING DEVICE THEREWITH FOR SUPPLYING IMAGES WITH GOOD GRADATION FOR BOTH FRONT-LIT AND BACK-LIT OBJECTS

[75] Inventors: Akihiro Tamura, Yawata; Shigeo Sakaue, Moriguchi, both of Japan

[73] Assignee: Matsushita Electric Industrial Co., Ltd., Osaka, Japan

[21] Appl. No.: 201,426

[22] Filed: Feb. 24, 1994

[30] Foreign Application Priority Data

Feb. 24, 1993 [JP] Japan .................................. 5-035105
Jun. 3, 1993 [JP] Japan .................................. 5-133096

[51] Int. Cl.$^6$ .............................. H04N 1/56; H04N 1/60; H04N 5/217
[52] U.S. Cl. ..................... 358/158; 358/520; 358/521; 348/234; 348/255
[58] Field of Search ............................... 358/521, 522, 358/520, 518, 458, 463, 530; 348/607, 624, 255, 254, 241, 242, 256, 234; 382/167

[56] References Cited

U.S. PATENT DOCUMENTS

| | | |
|---|---|---|
| 4,365,304 | 12/1982 | Ruhman et al. . |
| 4,792,979 | 12/1988 | Nomura et al. ......................... 358/458 |
| 4,903,145 | 2/1990 | Funada . |
| 4,941,037 | 7/1990 | Sasaki et al. . |
| 4,963,036 | 10/1990 | Drisko et al. . |
| 5,065,247 | 11/1991 | Haruki . |
| 5,065,248 | 11/1991 | Homma . |
| 5,075,767 | 12/1991 | Takaragi . |
| 5,075,778 | 12/1991 | Saito . |
| 5,239,378 | 8/1993 | Tsuji et al. ............................. 348/607 |
| 5,241,386 | 8/1993 | Tsuji et al. ............................. 348/607 |
| 5,289,282 | 2/1994 | Tsuji et al. ............................. 348/607 |

FOREIGN PATENT DOCUMENTS

| | | |
|---|---|---|
| 61-285880 | 12/1986 | Japan . |
| 63-042575 | 2/1988 | Japan . |
| 63-177679 | 7/1988 | Japan . |
| 2-125589 | 5/1990 | Japan . |
| 2-206282 | 8/1990 | Japan . |
| 4229788 | 8/1992 | Japan . |

*Primary Examiner*—Scott A. Rogers
*Attorney, Agent, or Firm*—Wenderoth, Lind & Ponack

[57] ABSTRACT

An average luminance Y is added to a correction coefficient by an adder. The correction coefficient characterizing the gradation correction characteristic of input picture signals of a picture is determined easily according to feature quantities extracted from input picture signals. A first gradation correction characteristic and a second gradation correction characteristic are added to a weight according to the correction coefficient and a correction gain of the gradation correction characteristic is determined. Thus, gradation can be corrected for all kinds of pictures including front-lit and back-lit objects. Further, by using the average luminance Ya, gradation is corrected in pixel units so as to keep contrast and to send an output signal with good gradation. A quantizer in the correction coefficient determination circuit quantizes the level distribution of the luminance signal and the correction coefficient determination circuit provides the correction coefficient according to the quantized value. Thus, the correction coefficient determination circuit can be constructed with a small scale circuit. A image sensing device including the gradation correction device can provide an output image wherein gradation is not deteriorated, noise is not obvious and gradation can be expressed well over an entire image plane.

24 Claims, 16 Drawing Sheets

Fig. 10

| Input signal | | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| | 100+M/4−L/2 | 0~5 | ~11 | ~17 | ~23 | ~29 | ~35 | ~41 | ~69 | ~75 | ~81 | ~87 | ~93 | ~99 | ~105 | ~255 |
| | H | 0~91 | ~97 | ~103 | ~109 | ~115 | ~121 | ~127 | ~255 | | | | | | | |
| RAM | Q1 Q2 | | | | | | | | | | | | | | | |
| | Input | | | | | | | | | | | | | | | | quantized output

Fig. 11

| | Least significant 4 bits : quantized value of (100+M/4−L/2) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | −4.0 | −3.0 | −2.5 | −2.0 | −1.5 | −1.0 | −0.5 | 0.0 | 0.5 | 1.0 | 1.5 | 2.0 | 2.5 | 3.0 | 4.0 | 4.0 |
| 1 | −3.0 | −2.5 | −2.0 | −1.5 | −1.0 | −0.5 | 0.0 | 0.5 | 1.0 | 1.5 | 2.0 | 2.0 | 2.5 | 3.0 | 4.0 | 4.0 |
| 2 | −2.5 | −2.0 | −1.5 | −1.0 | −0.5 | 0.0 | 0.5 | 1.0 | 1.5 | 2.0 | 2.0 | 2.0 | 2.5 | 3.0 | 4.0 | 4.0 |
| 3 | −2.0 | −1.5 | −1.0 | −0.5 | 0.0 | 0.5 | 1.0 | 1.5 | 2.0 | 2.0 | 2.0 | 2.5 | 2.5 | 3.0 | 4.0 | 4.0 |
| 4 | −1.5 | −1.0 | −0.5 | 0.0 | 0.5 | 1.0 | 1.5 | 2.0 | 2.5 | 2.5 | 2.5 | 2.5 | 2.5 | 3.0 | 4.0 | 4.0 |
| 5 | −1.0 | −0.5 | 0.0 | 0.5 | 1.0 | 1.5 | 2.0 | 2.5 | 3.0 | 3.0 | 3.0 | 3.0 | 3.0 | 3.0 | 4.0 | 4.0 |
| 6 | −0.5 | 0.0 | 0.5 | 1.0 | 1.5 | 2.0 | 2.5 | 3.0 | 4.0 | 4.0 | 4.0 | 4.0 | 4.0 | 4.0 | 4.0 | 4.0 |
| 7 | 0.0 | 0.5 | 1.0 | 1.5 | 2.0 | 2.5 | 3.0 | 4.0 | 4.0 | 4.0 | 4.0 | 4.0 | 4.0 | 4.0 | 4.0 | 4.0 |

Most significant 3 bits : quantized value of H

GRADATION CORRECTION DEVICE AND IMAGE SENSING DEVICE THEREWITH FOR SUPPLYING IMAGES WITH GOOD GRADATION FOR BOTH FRONT-LIT AND BACK-LIT OBJECTS

BACKGROUND OF THE INVENTION

1. Field of the Invention

The present invention relates to a gradation correction device for correcting gradation of input picture signals and a device therewith such as a camcorder or a video printer.

2. Description of the Prior Art

When a dark object is taken in a picture with a camcorder or the like, the object in an output picture becomes darkened with poor gradation. In particular, when a back-lit object is taken in a picture, extreme black or white portions appear in the picture and an output picture becomes unnatural. Therefore, a gradation correction device is needed to be installed in a camcorder or the like which processes picture signals of a 1-field picture.

Many gradation correction circuits have been developed. For example, a prior art gradation correction circuit is disclosed in Japanese Laid-open Patent Publication No. 125,589/1990 on the correction of image quality of an image sensing device. In the gradation correction circuit, a luminance signal Y is first attenuated and next amplified nonlinearly. A nonlinear portion is extracted from amplified signal and added to the luminance signal Y. Thus, half-tone signals are emphasized while signals of high and low luminances are preserved. Thus, the image quality of a main object and background under back light can be improved.

However, in the above-mentioned prior art, only intermediate luminance levels are expanded. Therefore, it is a problem for a strongly back-lit object that gradation becomes poor between intermediate and high levels of picture signals. Further, though image quality can be increased a little for an object under back light, gradation for a front-lit object or for am object having gradation ranging from low to high levels becomes poor in some portions or an output image becomes unnatural.

A second prior art gradation correction circuit is disclosed in Japanese Laid-open Patent Publication No. 206282/1990. In the above-mentioned circuit, image signals are divided into predetermined ranges of signal levels, and an average or an integrated value of image signals in each level range is detected. A gain control data ROM has stored a gain or attenuation amount for a gamma correction controller in correspondence with the average of image signals in each level range. By controlling the gamma correction characteristic in correspondence with he output signal of the gain control data ROM, extreme white or black portions can be prevented from appearing in an output picture.

In the above-mentioned second prior art, the deterioration of an image due to extreme black portions can be prevented by increasing the gain at low luminance, while the deterioration of an image at extreme white portions can be prevented by controlling the attenuation at intermediate and high luminances. However, it is a problem that gradation at high luminance becomes poor. Further, though gradation correction characteristic has to be changed for front-lit objects and for back-lit objects, it is not easy to change gradation correction characteristic for front-lit objects and for back-lit objects. It is also a problem that an output picture becomes unstable and unnatural if the prior art gradation correction circuit is applied to a video camera which deals a moving picture.

SUMMARY OF THE INVENTION

An object of the present invention is to provide a gradation correction device which can supply an output image of good gradation expression in an entire picture for a front-lit object and for a back-lit object.

Another object of the present invention is to provide a gradation correction device which can vary gradation characteristic easily for various kinds of pictures, for example, a back-lit object or a front-lit object.

Still another object of the present invention is to provide a gradation correction device which can correct the gradation of a moving picture.

A further object of the present invention is to provide an image sensing device with a gradation correction circuit which can supply an output image of good gradation expression in an entire picture of various kinds of pictures, for example, a front-lit object and a back-lit object.

In one aspect of a gradation correction device of the invention, a feature quantity extraction means extracts feature quantities (for example frequency values of a histogram of luminance) from input digital picture signals of a 1-frame picture or of a 1-field picture. The feature quantities reflect luminance level distribution of the input digital picture signals. Then, a gradation correction characteristic is determined based on the feature quantities. A gradation correction characteristic defines an output signal for an input signal. Then, each of the input digital picture signals is corrected by using the gradation correction characteristic. Thus, the gradation correction characteristic for the input digital picture signals is changed naturally for an input picture such as a moving picture according to features thereof. An image sensing device according to the present invention comprises such a gradation correction device. For a moving picture, a gradation correction characteristic is changed preferably only after successive increases or decreases in the correction amount of input picture signals by many times more than a prescribed number of pictures in order to stabilize the gradation correction characteristic even when the input picture signal includes some noise signals.

In another aspect of a gradation correction device of the present invention, a gradation correction characteristic is determined according to the feature quantities by averaging two prescribed gradation correction characteristic with a weight. The weight is determined according to an input digital picture signal or an average of input digital picture signals. More concretely, a correction coefficient characterizing a gradation correction characteristic used for gradation correction is determined based on the feature quantities, and an input picture signal is corrected by using a gain for the signal determined according to the correction coefficient.

An advantage of a gradation correction device or an image sensing device therewith is that it can determine a most suitable gradation correction characteristic automatically according to feature quantities obtained from input picture signals.

Another advantage of a gradation correction device or an image sensing device therewith according to the present invention is that an output picture of good color balance and rich gradation expression can be obtained for every picture from back-lit object to front-lit object without deteriorating gradation and that extreme black or white portions in an output picture can be prevented by using a simple structure.

Still another advantage of a gradation correction characteristic according to the present invention is that gradation correction can be performed naturally even for a moving picture because gradation correction characteristic can be changed gradually.

BRIEF DESCRIPTION OF THE DRAWINGS

These and other objects and features of the present invention will become clear from the following description taken in conjunction with the preferred embodiments thereof with reference to the accompanying drawings, and in which:

FIG. 10 is a diagram for illustrating the contents of two quantization memories;

FIG. 11 is a diagram for illustrating the content of a decision memory;

DETAILED DESCRIPTION OF THE PREFERRED EMBODIMENTS

Figure 1:
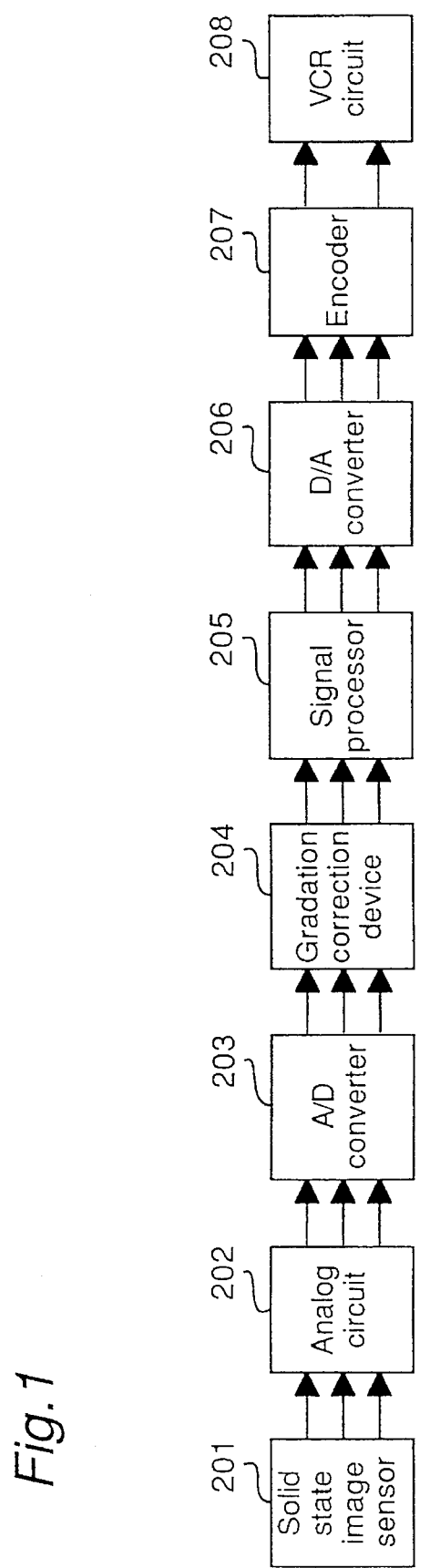
FIG. 1 is a block diagram of a camcorder using a gradation correction device in accordance with a first embodiment of the present invention.
Figure 5:
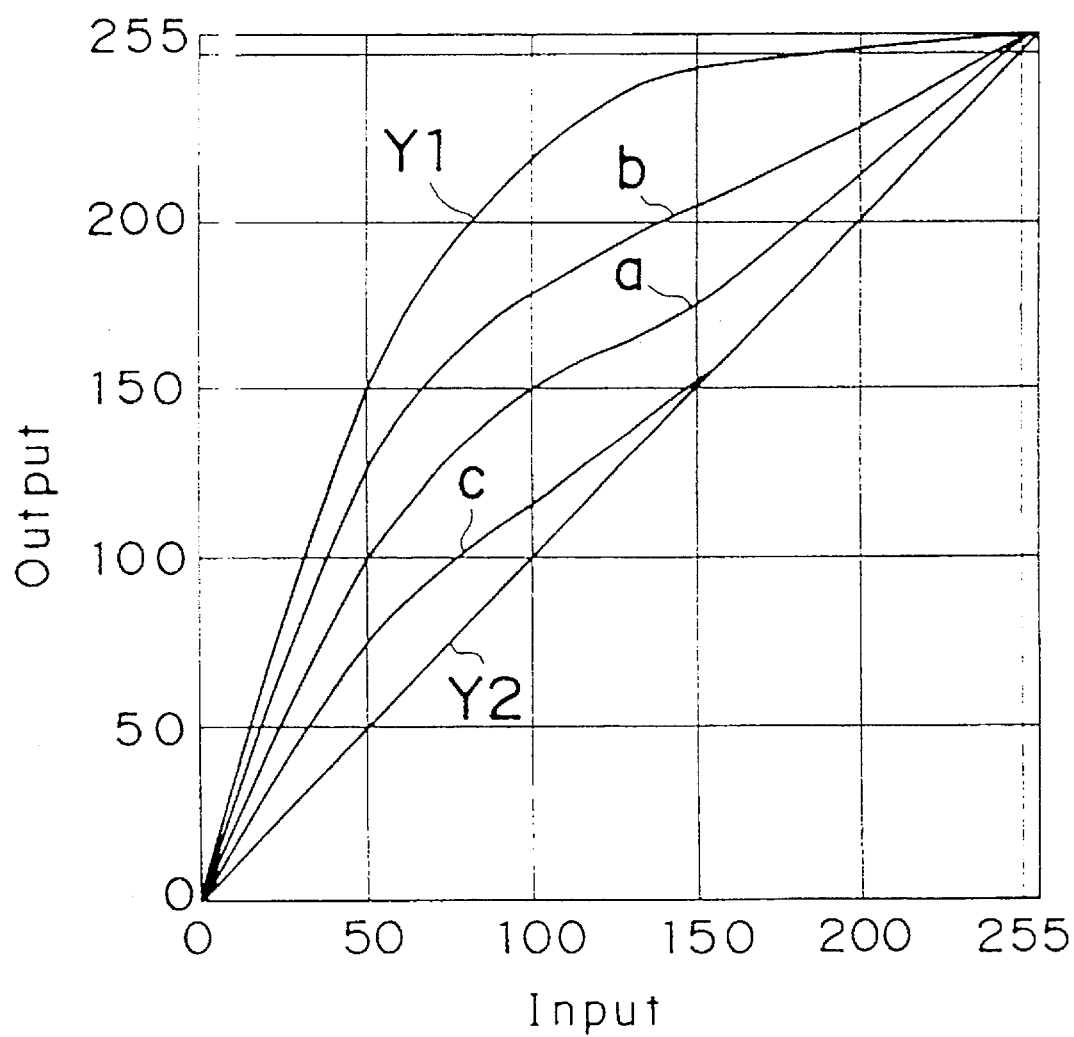
FIG. 5 is a diagram of gradation correction characteristic.

Referring now to the drawings, wherein like reference characters designate like or corresponding parts throughout the views, FIG. 1 shows a block diagram of a camcorder including a gradation correction device 204 of a first embodiment of the present invention. First, R, G and B signals as input picture signals detected by a solid state image sensor 201 such as a charge coupled device (CCD) is supplied through an analog circuit 202 to an analog-to-digital converter 203. The converter 203 converts the R, G and B signals to digital data of 0–255 levels to be supplied to the gradation correction device 204. In the gradation correction device 204, a gradation correction characteristic most appropriate to the input picture signals is determined and gradation correction is performed according thereto. A gradation correction characteristic is referred hereinafter to a relationship of the output signal with respect to the input signal, as shown in FIG. 5. On the corrected R, G and B signals, a signal processor 205 performs signal processing such as aperture processing. The processed digital R, G and B signals are converted to analog R, G and B signals by a digital-to-analog converter 206. Next, an encoder 207 converts the analog R, G and B signals to signal (luminance signal) and C signals (color signals) and a VCR circuit 208 records them on a video tape.

Figure 2:
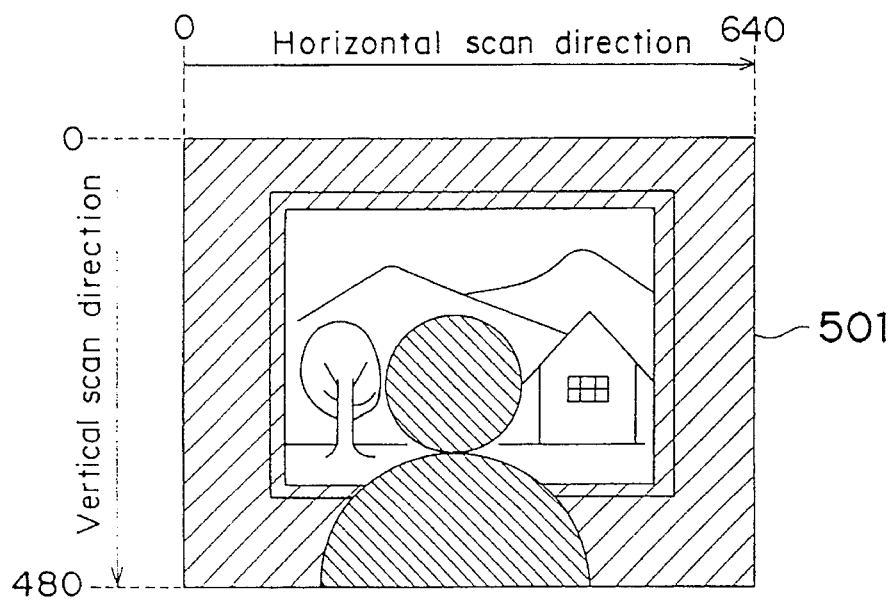
FIG. 2 is a diagram of a 1-frame image of input picture signals.

FIG. 2 shows an example of a 1-frame picture of input picture signals in a frame plane 501. This picture shows a person standing in front of a window. Due to strong backlight, the person becomes very dark while a landscape which can be seen through the window becomes very bright.

Figure 3:
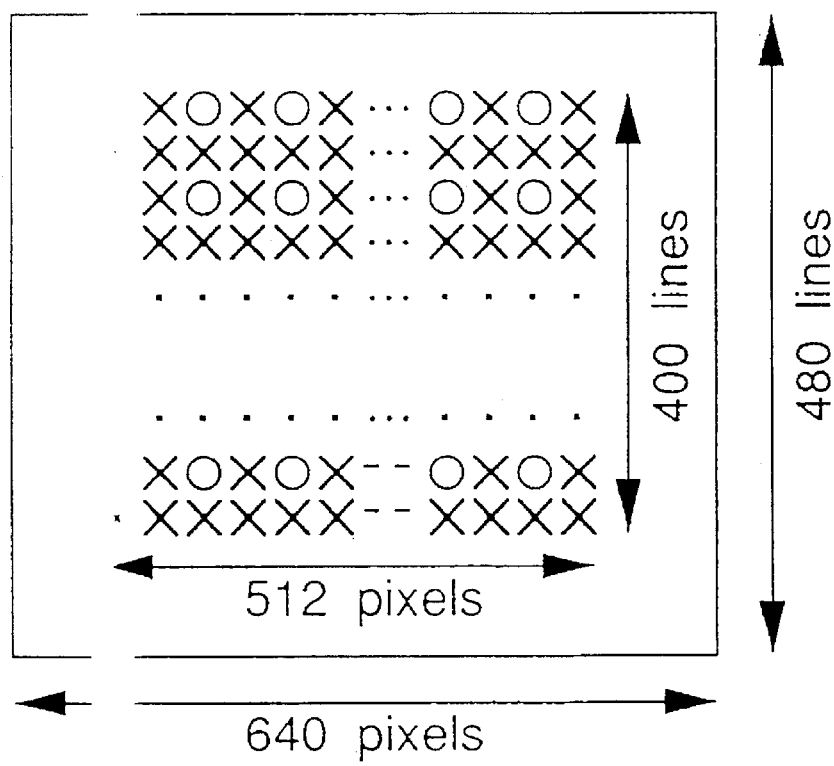
FIG. 3 is a diagram of effective pixels in the 1-frame image.

The number of samples in the frame plane 501 is 640 points along a horizontal direction and 480 points along a vertical direction. FIG. 3 shows effective pixels in the frame plane 501, wherein effective pixels are represented as open circles (o). The effective pixels selected consists of every other pixel in the horizontal direction and every other line in a central region of 512 pixels in the horizontal direction and 400 lines along a vertical lines. Therefore, the number of samples in the effective area is 256 points along the horizontal direction and 200 points along the vertical direction.

In the above-mentioned example, the effective area consists of 256 points times 200 points. However, the area size or point number of signals for expressing the number of pixels may be selected to be any number large enough to extract features of an input picture, and feature quantities can be extracted by counting the frequencies of pixels in different level ranges in the effective area in a histogram. The bit number of feature quantities or frequencies of pixels may also be any number large enough to express features of a picture.

Figure 4:
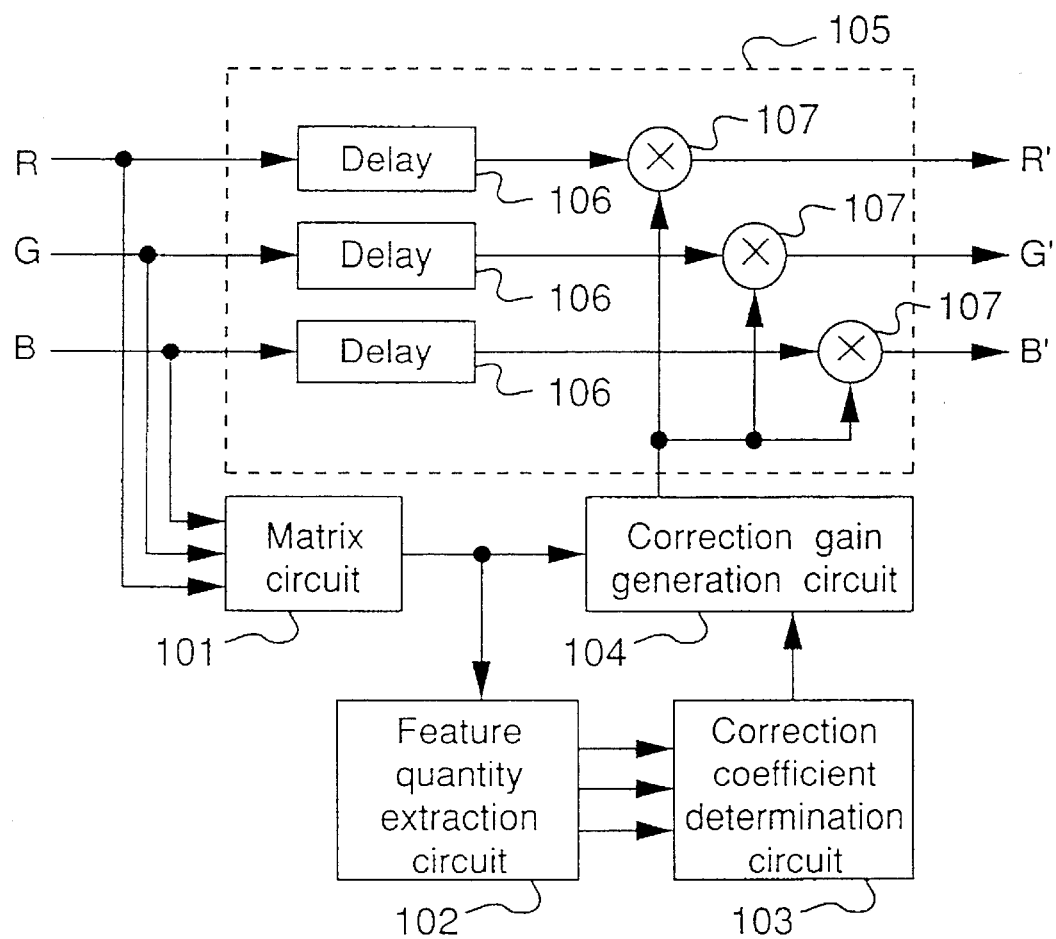
FIG. 4 is a block diagram of a gradation correction device in the first embodiment of the present invention.

FIG. 4 shows a block diagram of the gradation correction device 204. A known matrix circuit 101 receives input picture signals and provides luminance signal Y to a feature quantity extraction circuit 102 and to a correction gain generation circuit 104. The feature quantity extraction circuit 102 extracts feature quantities from the luminance signals Y in the above-mentioned effective area. The feature quantities which are used to determine gradation correction characteristic are defined to represent the kind of a picture. In the present embodiment, the feature quantities represent level distribution of the luminance signals Y in the effective pixels of 256 * 200 dots. Then, a correction coefficient determination circuit 103 determines a gradation correction characteristic appropriate for the input digital picture signals of the picture according to the extracted feature quantities. More concretely, the correction coefficient determination circuit 103 determines a correction coefficient characterizing the appropriate gradation correction characteristic and the correction coefficient is used to correct the input picture signals. Then, input digital picture signals are corrected according to the appropriate gradation correction characteristic. That is, first, the correction gain generation circuit 104 receives the luminance signal Y and the correction coefficient received from the correction coefficient determination circuit 103 and sends a correction gain (Y'/Y) to a correction circuit 105. Finally, the correction circuit 105 adjusts the timing of the R, G and B signals with the correction gain by delays 106 by a delay time for calculating the gradation correction characteristic, and it multiplies them by the correction gain (Y'/Y) by the multipliers 107 to supply R', G' and B' signals after gradation correction to the signal processor 205. Thus, by using the correction gain commonly for the digital R, G and B signals, an output picture of good color balance and rich gradation expression can be supplied. Though the delays 106 are used for timing control in the circuit 105, 1-field or 1-frame memories may be used instead of the delays 106. In such a case, a same picture is read twice. As explained below, it is a characteristic of the gradation correction device 204 that it processes digital data. Thus, it is relatively easy to change gradation characteristic according to the features of various kinds of a picture.

In the gradation correction device 204 of the present embodiment, gradation correction characteristic is determined automatically according to feature quantities extracted from input digital picture signals. The gradation correction characteristic represents a relationship of the output level with respect to the input level of picture signals. FIG. 5 shows gradation correction characteristic in the present embodiment, wherein reference sign Y1 denotes a first gradation correction characteristic and reference sign Y2 denotes a second gradation correction characteristic. In the present embodiment, a corrected value or input picture signal can easily be obtained, as will be explained later, by using the gradation correction coefficient which characterizes an interpolation characteristic between the two Y1 and Y2. Therefore, an output picture of good color balance and rich gradation expression can be supplied for all objects from a back-lit object to a front-lit object without a deteriorating gradation.

The gradation correction device 204 is explained in detail below. The matrix circuit 101 receives R, G and B digital signals of levels 0–255 as input picture signals. If R=G=B= 255, these color signals represent white. The luminance Y increases with increasing values of these signals. The matrix circuit 101 calculates luminance signal Y from R, G and B signals. The luminance signal Y can be obtained for example by using the following relationship:

$$Y = 0.30R + 0.59G + 0.11B. \tag{1}$$

The luminance Y ranges also between 0 and 255. The luminance Y is supplied to the feature quantity extraction circuit 102 and to the correction gain generation circuit 103.

Figure 6:
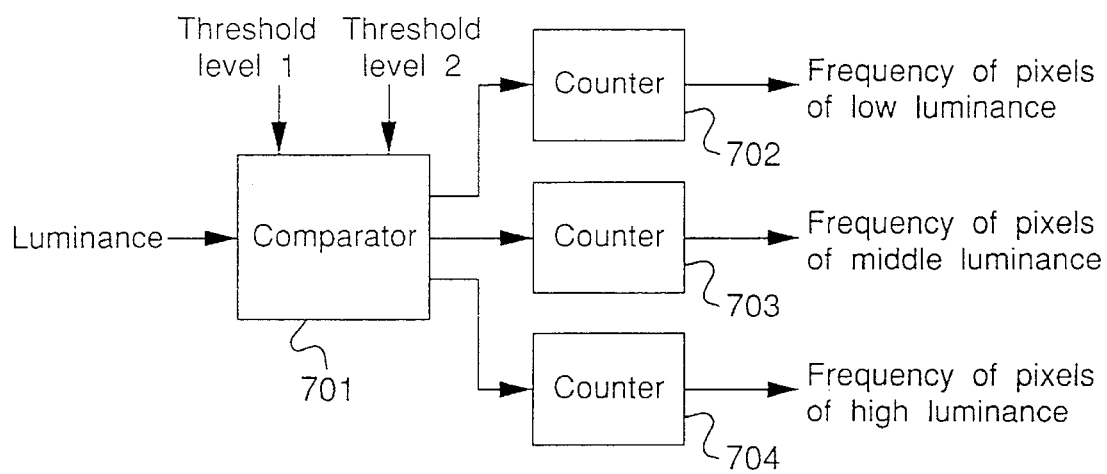
FIG. 6 is a block diagram of a feature quantity extraction circuit.

FIG. 6 shows the feature quantity extraction circuit 102 for extracting feature quantities from the luminance signals Y of a picture. In this example, frequencies of luminance signal at three sections of low, middle and high luminances are counted over an effective area in a 1-frame picture, and the frequencies are used as feature quantities. In particular, the input luminance signal Y is compared with first and second threshold values by a comparator 701. If the luminance signal Y is smaller than the first threshold value, a count signal for low luminance section is supplied to a first counter 702. If the luminance signal Y is between the first and second threshold values, a count signal for middle luminance section is supplied to a second counter 703. If the luminance signal is larger than the second threshold value, a count signal for high luminance section is supplied to a third counter 704. Thus, the counters 702, 703 and 704 provide the frequencies of low, middle and high luminance sections for an effective area.

Figure 7:
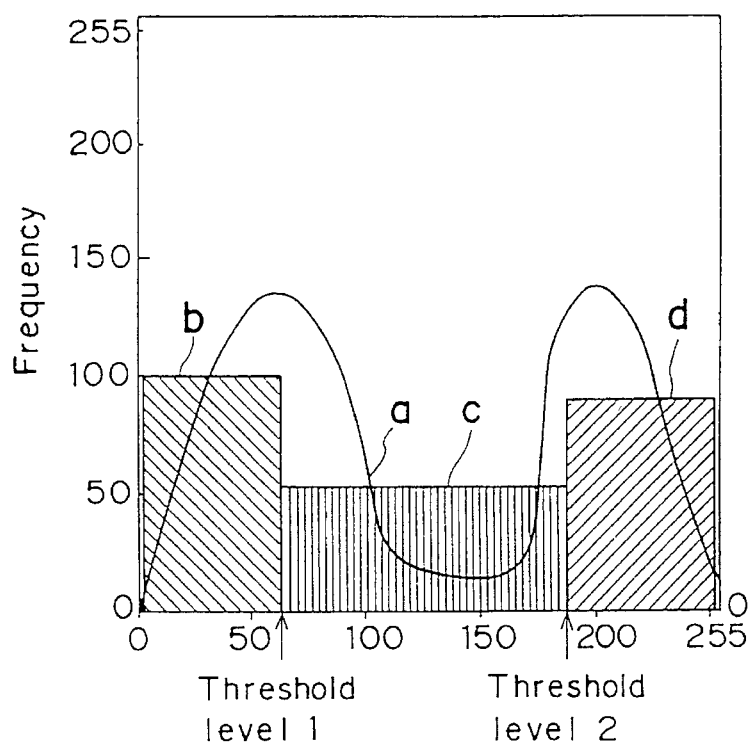
FIG. 7 is a histogram of luminance in an example.

FIG. 7 shows an example of a histogram of luminance obtained by the feature quantity extraction circuit 102. A histogram "a" obtained by counting frequencies at each luminance level is illustrated for comparison. Reference signs "b", "c" and "d" denote frequencies of pixels of low luminance section from 0 to 63, of middle luminance section from 64 to 191 and of high luminance section from 192 to 255, respectively. The histogram shown in FIG. 7 has two peaks at low and high luminance sections larger than the number at middle luminance section. Therefore, it is guessed that this picture is taken for a back-lit object.

In the example explained above, the feature quantity extraction circuit 102 provides frequencies of pixels for three luminance levels. The two threshold values for determining sections for extraction can be changed suitably. The number of luminance level sections may also be different from three.

Figure 8:
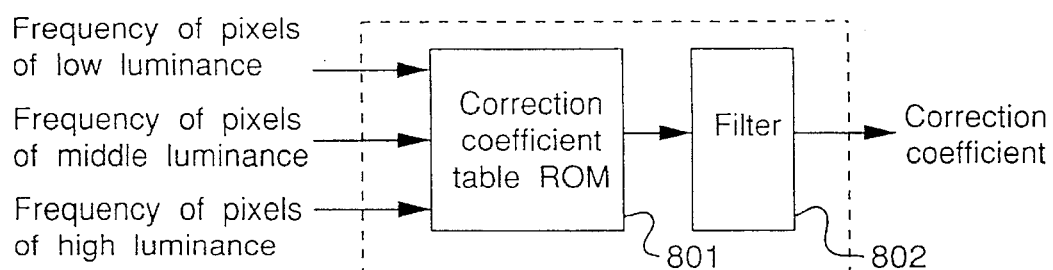
FIG. 8 is a block diagram of a correction coefficient determination circuit.

FIG. 8 shows a correction coefficient determination circuit 103. A correction coefficient table ROM 801 stores correction coefficients for a front-lit object, for a back-lit object, for a dark object and the like while receiving frequencies of pixels of low, middle and high luminance sections as input signals. Therefore, when the three frequencies of pixels of low, middle and high luminance sections are received by the correction coefficient table ROM 801 from the feature quantity extraction circuit 102, a correction coefficient is determined for gradation correction of an input picture. The correction coefficient is filtered by the filter 802 so as to keep gradation continuity of moving pictures with respect to previous frames, as will be explained later.

Figure 9:
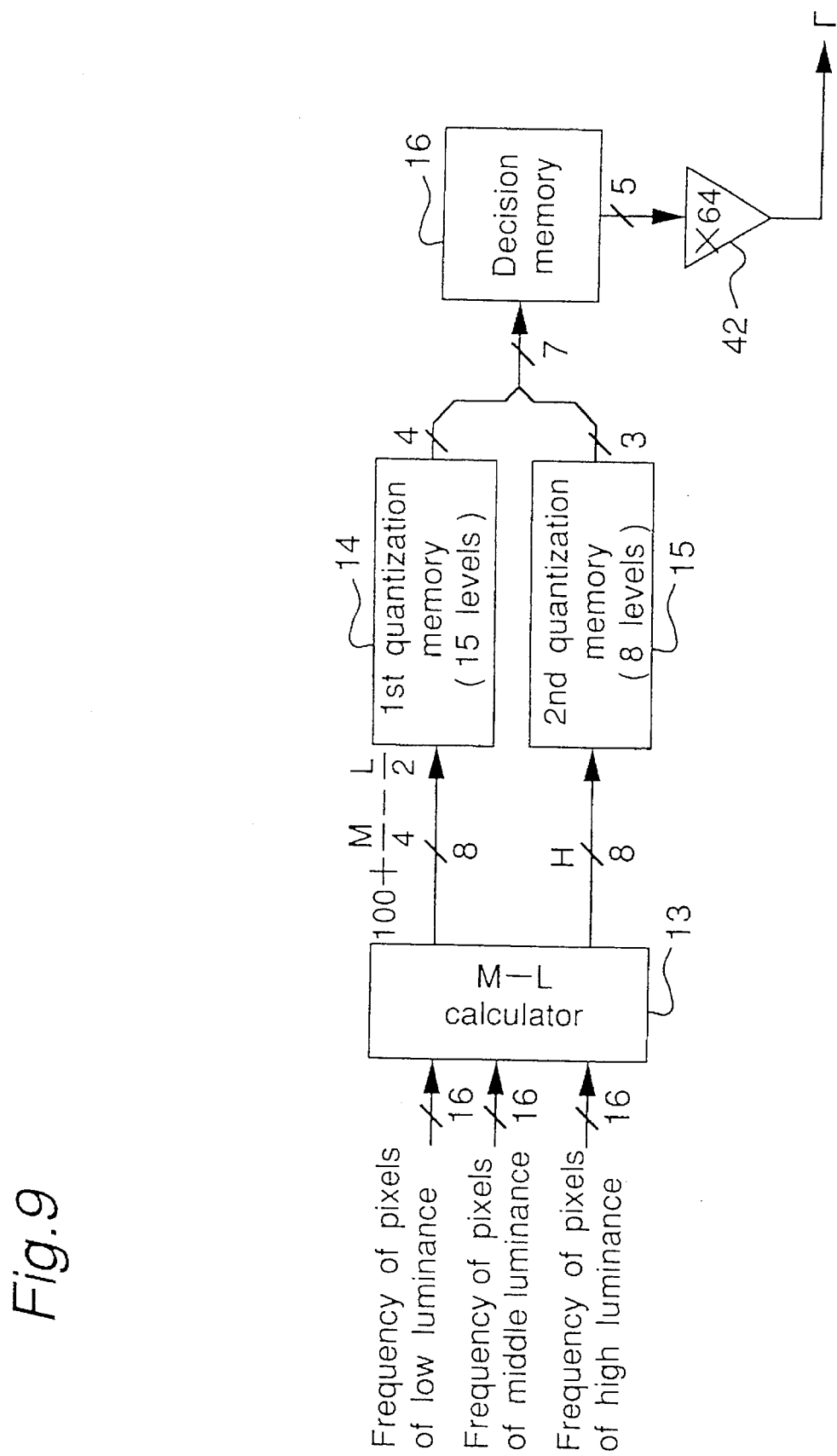
FIG. 9 is a block diagram of an internal structure of a correction coefficient table ROM.

FIG. 9 shows an internal structure of an example of the correction coefficient table ROM 801 including an M-L calculator 13, a first quantization memory 14, a second quantization memory 15, a decision memory 16 and a bit shift circuit 42 for shifting 6-bit data to the left. This combination of the memories 14, 15 and 16 is adopted to reduce the memory capacity. The M-L calculator 13 receives 16-bit data of the frequencies of pixels of low, middle and high luminance sections and generates values L, M and H as most significant 8-bit data of the 16-bit data. It also calculates (100+M/4−L/2). Then, it provides 8-bit data of (100+M/4−L/2) and of H to the quantization memories 14 and 15 as addresses.

FIG. 10 shows an example of the contents of the quantization memories 14 and 15. For example, the first quantization memory 14 provides "0" if 0≦(100+M/4−L/2) ≦5. As shown in FIG. 7, the level width of middle luminance section is double that of low luminance range. For example, if the sign of (M/4−L/2) is negative, the object in the picture under interest is decided to be back-lit. The value "100" is a constant added for convenience. The memories 14 and 15 provide quantization values of a 4-bit data and of a 3-bit data, respectively. The capacity of the first quantization memory 14 is 128 bytes (or 256 words times 4 bits), while that of the second one 15 is 96 bytes (or 256 words times 3 bits).

FIG. 11 shows the content of the decision memory 16. The decision memory 16 receives the 4-bit quantization value from the first quantization memory 14 and the 3-bit quantization value from the second one 15 as a 7-bit address signal, and it provides a 5-bit parameter (Γ) in correspondence to the address. For example, if "0" is received from the first quantization memory 14 and "0" is also received from the second one 15, the decision memory 16 provides "−4.0". It is shown that an output value increases from −4.0 to +4.0 from a back-lit object (M/4<L/2) to a front-lit object (M/4>L/2). It is also shown that an output value increases with increasing H. The capacity of the decision memory 16 is 80 bytes (or 128 words times 5 bits).

As explained above, the correction coefficient table ROM 801 includes series connection of the quantization memories 14, 15 and the decision memory 16. Therefore, the memory capacity becomes as small as 128+96+80=304 bytes. If this is compared with a single ROM (40 kbytes) of 16-bit address and 5-bit output value, the memory capacity can be decreased to about one 135-th of the original amount.

Figure 12:
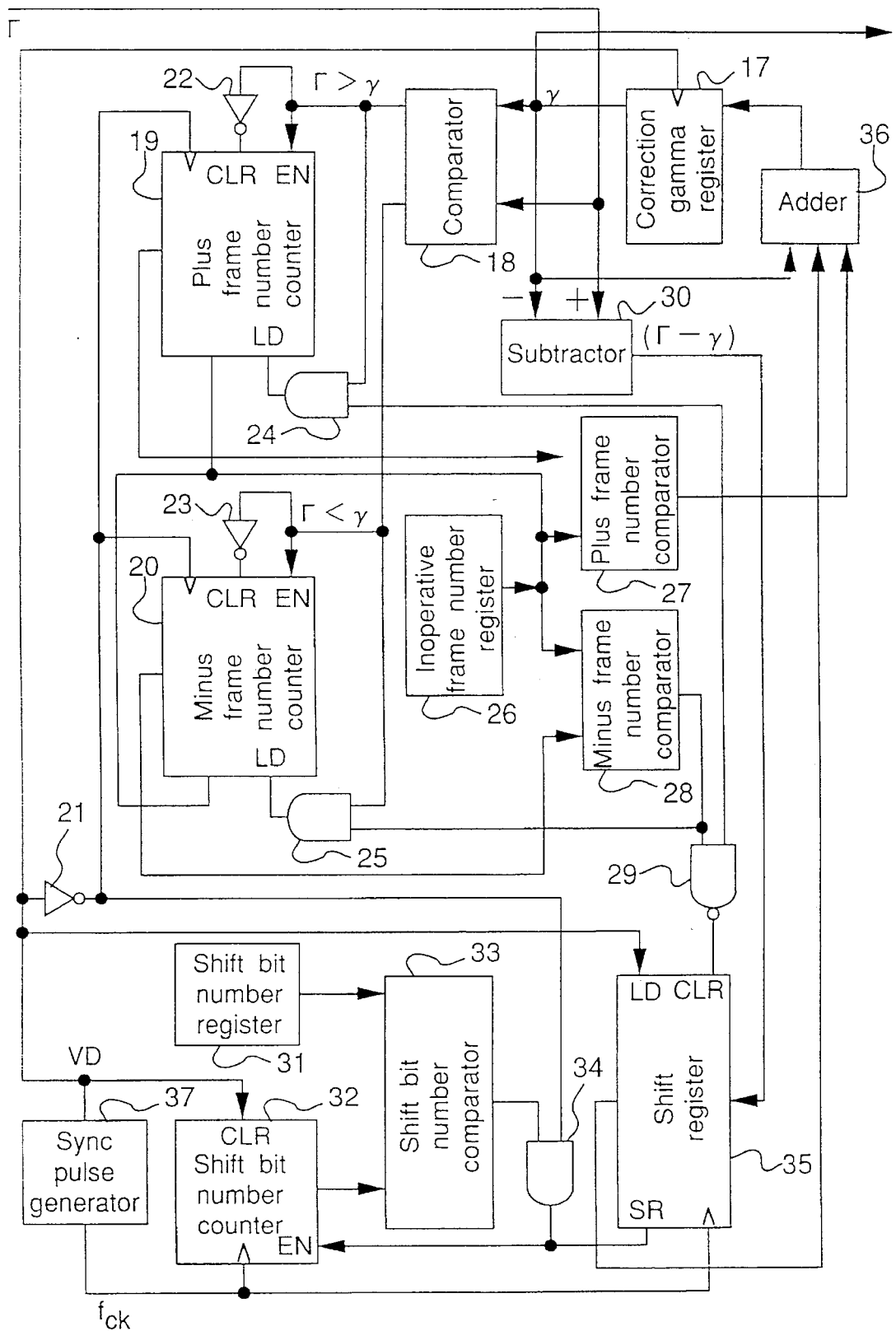
FIG. 12 is a circuit diagram of a filter.

FIG. 12 shows a circuit diagram of the filter 802 in detail. A synchronous pulse generator 37 generates pulse signals (VD) and master clock signals ($f_{ck}$), both having rising edges in synchronization with the start of a frame. Further, reference numeral 18 denotes a comparator, reference numerals 21, 22 and 23 denote inverters, reference numerals 23, 25 and 34 denote AND gates. A subtractor 30 receives a 5-bit parameter $\Gamma$ from the correction coefficient table ROM 801 and the correction coefficient ($\gamma$) for the previous frame held in a correction gamma register 17 and calculates a difference ($\Gamma-\gamma$). A shift bit number counter 32 counts master clock signals, and a shift bit number comparator 33 compares the count of the counter 32 with a number set in a shift bit number register 31 and supplied shift clocks to a shift register 35. The shift register 35 shifts the difference ($\Gamma-\gamma$) to right by a bit number set in the shift bit number register 31. An adder 36 adds the $\gamma$ of the previous frame with the shifted difference ($\Gamma-\gamma$) and supplies a sum to the correction gamma register 17 to update the correction coefficient for each frame. Thus, if the difference ($\Gamma-\gamma$) is large, the correction coefficient changes much, while if the difference ($\Gamma-\gamma$) is small, the correction coefficient changes little. In other words, a change amount of correction coefficient varies with the difference.

On the other hand, a plus frame number counter 19 counts a number of frames which has $\Gamma$ larger than $\gamma$ continuously, while a minus frame number counter 20 counts a number of frames which has $\Gamma$ smaller than $\gamma$ continuously. A plus frame number comparator 27 and a minus frame number comparator 28 compare the counts in the plus and minus frame number counters 19 and 20 with the inoperative frame number set previously in a register 26, respectively. If the number set in the inoperative frame number register 26 is smaller than the values set in the plus and minus frame number counters 19 and 20, the shift register 35 is cleared according to a pulse signal received from a NAND gate 29, and the adder 36 provides the same correction coefficient as that of the previous frame. Thus, the correction coefficient does not change until frames of $\Gamma>\gamma$ or $\Gamma<\gamma$ continue by more than the inoperative frame number.

Figure 13:
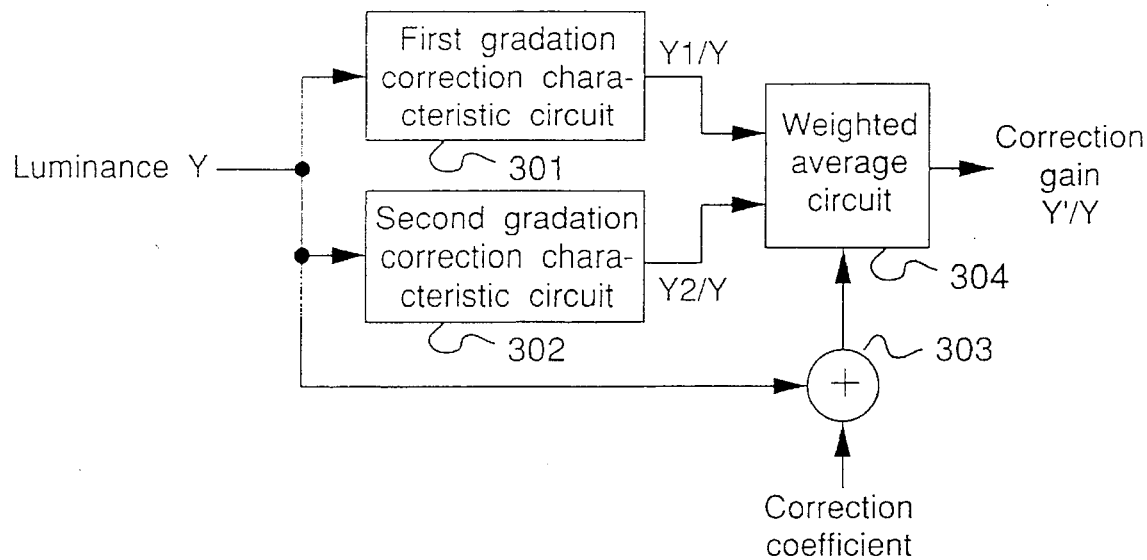
FIG. 13 is a block diagram of a gradation correction gain generation circuit of a first embodiment.

FIG. 13 shows a block diagram of the gradation correction gain generation circuit 104 of the first embodiment including a first gradation correction characteristic circuit 301, a second gradation correction characteristic circuit 302, an adder 303 and a weighted average circuit 304. An input luminance signal Y is supplied to the first and second gradation correction characteristic circuits 301 and 302. In the first gradation correction characteristic circuit 301, a first correction gain (Y1/Y) is sent according to the input luminance signal Y and Y1 obtained from a first gradation correction characteristic. Similarly, in the second gradation correction characteristic circuit 302, a second correction gain (Y2/Y) is sent according to the input luminance signal Y and Y2 obtained from a second gradation correction characteristic. On the other hand, the adder 303 adds the luminance signal Y with the correction coefficient $\gamma$ to send the sum as a signal X:

$$X=Y+\gamma. \tag{2}$$

Finally, the weighted average circuit 304 averages the first and second correction gains with a weight according to Equation (3) including a signal X and sends a correction gain (Y'/Y):

$$(Y'/Y)=\{(Y1/Y)*(255-X)+(Y2/Y)*X\}/255. \tag{3}$$

In the present embodiment, the first correction gain (Y1/Y) follows Equation (4) while the second correction gain (Y2/Y) follows Equation (5).

$$(Y1/Y)=\{\tfrac{1}{255}s s^2*(Y-255)^3+255\}/Y. \tag{4}$$

$$(Y2/Y)=Y/Y. \tag{5}$$

FIG. 5 shows gradation correction characteristics used in the present embodiment, wherein Y1 and Y2 denote the first and second gradation correction characteristics, respectively. For example, if the correction coefficient supplied from the determination circuit 103 is zero, the gradation correction characteristic is represented as "a". If the correction coefficient is positive, the gradation correction characteristic decreases below the characteristic "a", as illustrated, for example, by "c". If the correction coefficient is negative, the gradation correction characteristic increases above the characteristic "a", as illustrated, for example, by "b". Thus, by changing the gradation correction coefficient, the gradation correction characteristic can easily be changed gradually and continuously. By decreasing the correction coefficient, the correction gain at low and middle luminances increases gradually and finally it is enhanced in the entire range. Therefore, every object can be corrected to express rich gradation by using, for example, the gradation correction characteristic "Y2" for a front-lit object, the gradation correction characteristic "a" for a back-lit object and the gradation correction characteristic "Y1" for a dark object.

As explained above, the correction gain generation circuit 104 generates the correction gain for an input picture signal by using the correction coefficient, and the correction gain is used in the correction circuit 105 to correct the input picture signal by multiplying it with the correction gain. It is to be noted on the correction gain generation circuit 104 that it does not need ROMs or the like to store a plurality of kinds of gradation correction characteristics, and the scale of the circuit can be made very compact. Still furthermore, because a gradation correction characteristic can be generated for front-lit and back-lit objects by changing the correction coefficient, an output picture of good color balance and rich gradation expression can be obtained for all objects from back-lit object to front-lit object without deteriorating gradation. Still furthermore, because the gradation correction characteristic can be changed gradually and continuously, gradation correction can be performed naturally even for a moving picture. Also, the contrast at high luminance is preserved by the gradation correction characteristic "a" in FIG. 5 for back-lit object. On the other hand, in a prior art so-called auto-knee control, the gradation at high luminance is deteriorated.

Figure 14:
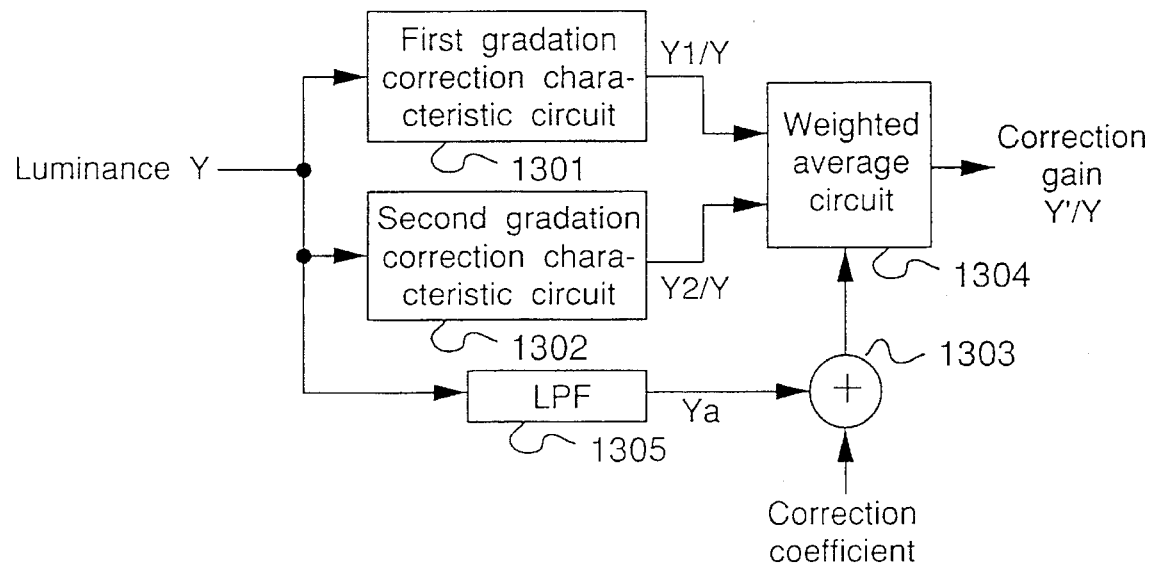
FIG. 14 is a block diagram of a gradation correction gain generation circuit in accordance with a second embodiment of the present invention.

Next, a second embodiment of the gradation correction device 204 is explained. It is similar to the first embodiment except for the correction gain generation circuit 104'. FIG. 14 shows a block diagram of the gradation correction gain generation circuit 104' of this embodiment. This circuit is different from that of the first example shown in FIG. 13 in that an average detection circuit (low pass filter) 1305 is newly provided to generate a weight. An input luminance signal Y is supplied to first and second gradation correction characteristic circuits 1301 and 1302. In the first gradation correction characteristic circuit 1301, a first correction gain (Y1/Y) is sent according to the input luminance signal Y. Similarly, in the second gradation correction characteristic circuit 1302, a second correction gain (Y2/Y) is sent according to the input luminance signal Y. On the other hand, the average detection circuit (LPF) 1305 obtains an average luminance Ya from luminance signals Y. That is, it averages luminance signals of say three or five pixels around a pixel of interest. An adder 1303 adds the average luminance Ya with the correction coefficient $\gamma$ to supply a signal X:

$$X = Ya + \gamma. \quad (2')$$

Finally, a weighted average circuit 1304 averages the first and second correction gains with a weight determined according to Equation (2') by using the signal X and supplies a correction gain (Y'/Y) to the correction circuit 105.

Figure 15:
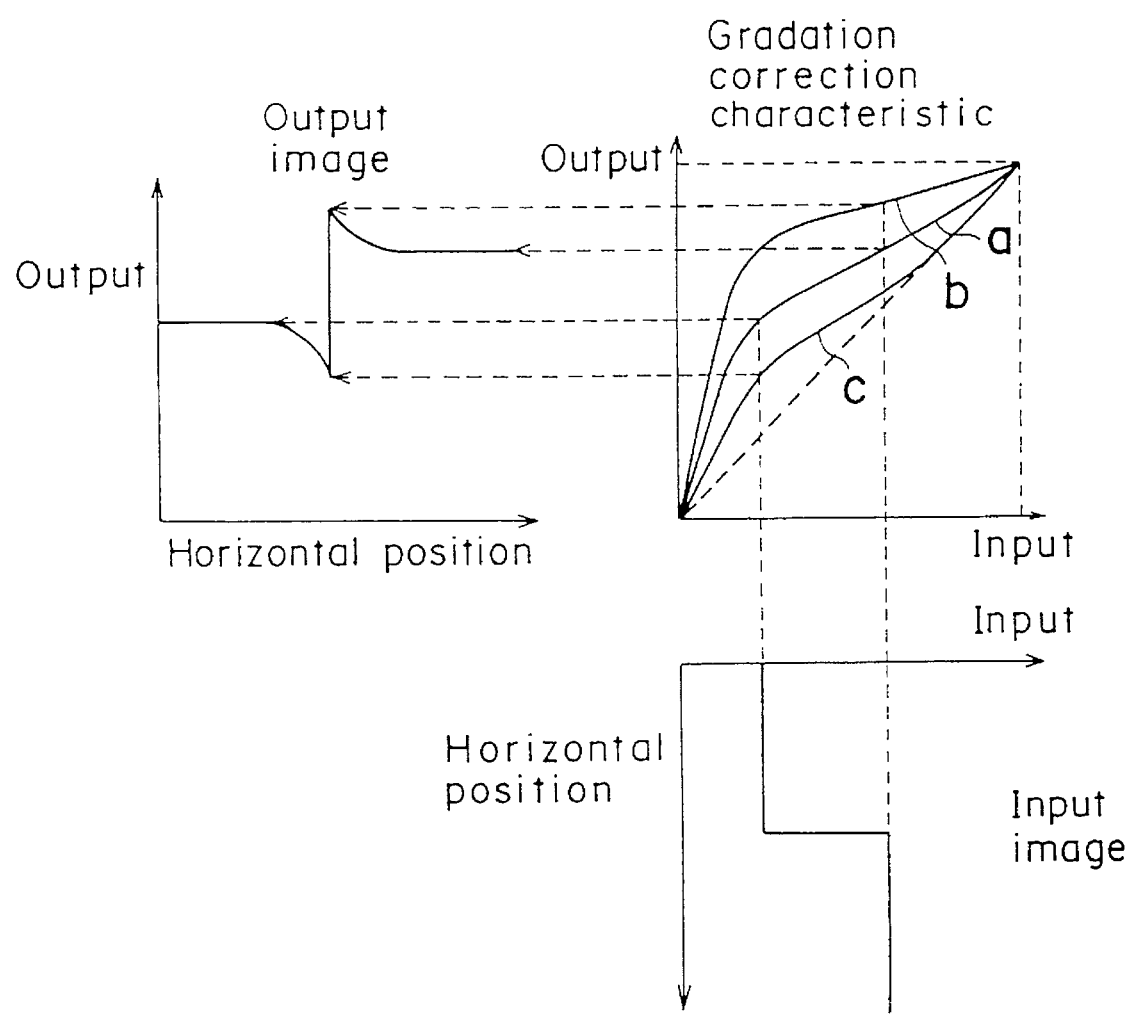
FIG. 15 is a diagram of gradation correction characteristic and input/output characteristic in the embodiment.

FIG. 15 illustrates gradation correction characteristics and input/output characteristic in an example. In an example shown in FIG. 15, when input picture signals along a horizontal line has a stepwise edge, output picture signals show edge emphasis. If the average luminance Ya obtained by the average detection circuit (LPF) 1305 is equal to a luminance signal Y of a pixel of interest, the gradation characteristic "a" shown in FIG. 15 is adopted. If the average luminance Ya is smaller than a luminance signal Y of a pixel of interest, the gradation characteristic "b" shown in FIG. 15 is adopted. If the average luminance Ya is larger than a luminance signal Y of a pixel of interest, the gradation characteristic "c" shown in FIG. 15 is adopted. Thus, the gradation correction characteristic can be changed for each pixel appropriately. Even if a gradation correction characteristic curve has a small slope, the contrast of an output picture is good, and output signals can express gradation richly.

Figure 16:
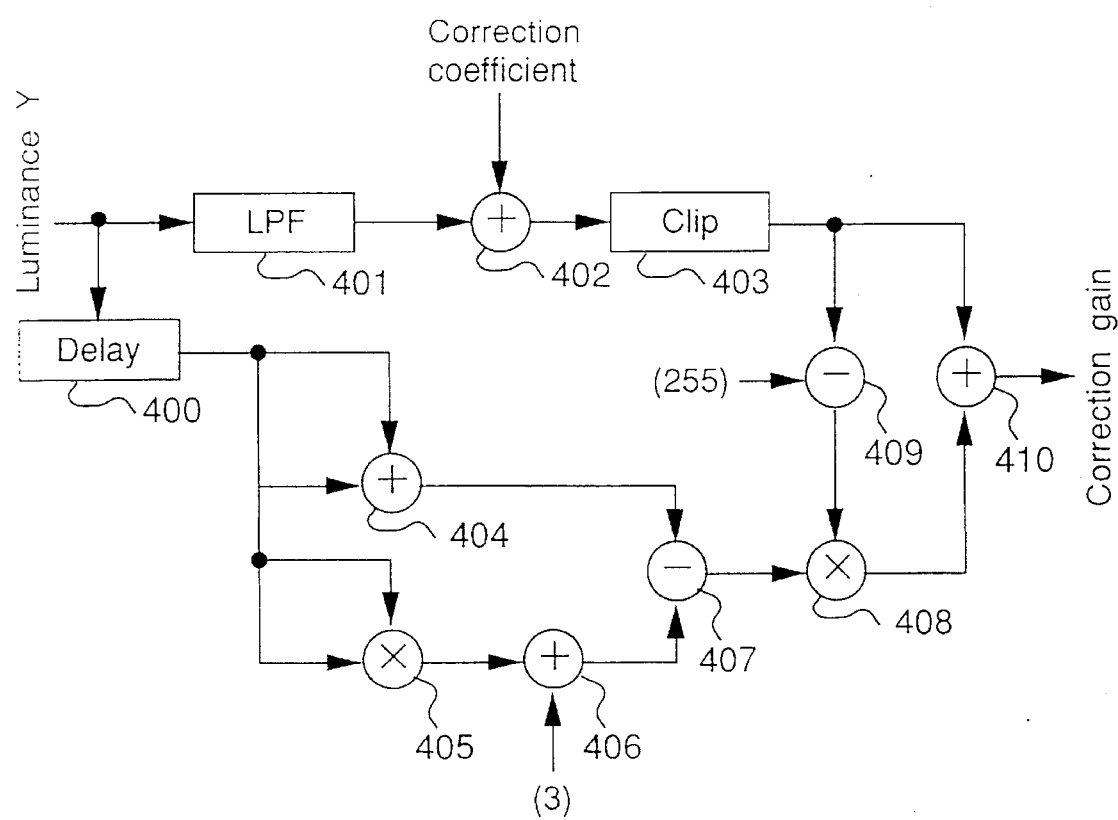
FIG. 16 is a block diagram of the gradation correction gain generation circuit of a second embodiment.

FIG. 16 shows a block diagram of an example of the gradation correction gain generation circuit 104'. The circuit calculates Equations (2'), (3), (4) and (5). The second gradation correction characteristic circuit 1402 in this example provides a second correction gain Y2/Y=1 according to the gradation correction characteristic shown in FIG. 5.

Next, the correction gain generation circuit 104' is explained further. The circuit is simplified by using bit shift for multiplication or division of 255 and the like. First, when a luminance signal Y is received, an average Ya is obtained by an average detection circuit (low pass filter) 401. Next, a first adder 402 adds the average luminance Ya with the correction coefficient. A clip circuit 403 clips an output signal of the first adder with a value "0" for smaller values and with a value "255" for larger values. On the other hand, the luminous signal Y is delayed via a delay 400 for synchronization and a signal 2Y obtained by one-bit shift of Y are received by a second adder 404, and a signal 2Y is added with Y to send a signal 3Y of three times Y. Further, a first multiplier 405 multiplies the luminance signal Y twice to generate a luminance signal $Y^2$. A third adder 406 adds the output of the first multiplier 405 with a value "3". Next, a first subtractor 407 subtracts the output signal "$Y^2+3$" of the third adder 406 with "3Y" of the second adder 404. The first gradation correction characteristic circuit 1301 of this example consists of the second adder 404, the first multiplier 405, the third adder 406 and the first subtractor 407. Then, the second subtractor 409 subtracts the output signal of the clip circuit 403 from "255". Then, a second multiplier 408 multiplies the output signal of a second subtractor 409 with that of the first subtractor 407. Finally, a fourth adder 410 adds the output signal of the clip circuit 403 with that of the second multiplier 408 to send a product as a correction gain.

The weighted average circuit 1404 consists of the second multiplier 408, the second subtractor 409 and the fourth adder 410.

As explained above, the correction gain is controlled according the correction coefficient with use of the gradation correction characteristics shown in FIGS. 5 and 15. Because a gradation correction characteristic can be generated for every object by changing the correction coefficient, an output picture of good color balance and rich gradation expression can be obtained for all objects from back-lit objects to front-lit objects without deteriorating gradation.

In particular, the average detection circuit 1305 averages input luminance signals including an input luminance signal of interest and input luminance signals thereabout. In other words, the circuit 1305 outputs an average of luminance signals around the input luminance signal of interest. Therefore, the luminance is corrected smaller or larger if the average luminance is larger or smaller. Therefore, even the gradation correction keeps contrast even if the slope of the gradation correction characteristic is small and output signals of rich gradation expression can be obtained.

The above-mentioned correction gain generation circuit 104' generates the correction gain by using the correction coefficient without ROMs and the like to store a plurality of kinds of gradation correction characteristics. Therefore, the scale of the circuit can be made very compact. Still further, the contrast at high luminance is preserved for a back-lit object. On he other hand, in a prior art so-called auto-knee control, the gradation at high luminance is deteriorated. Further, gradation correction is performed in the unit of pixel by changing the gradation correction characteristic suitably according to the average luminance Ya. Therefore, the gradation correction keeps contrast even if the slope of the gradation correction characteristic is small, and output signals of rich gradation expression can be obtained.

Figure 17:
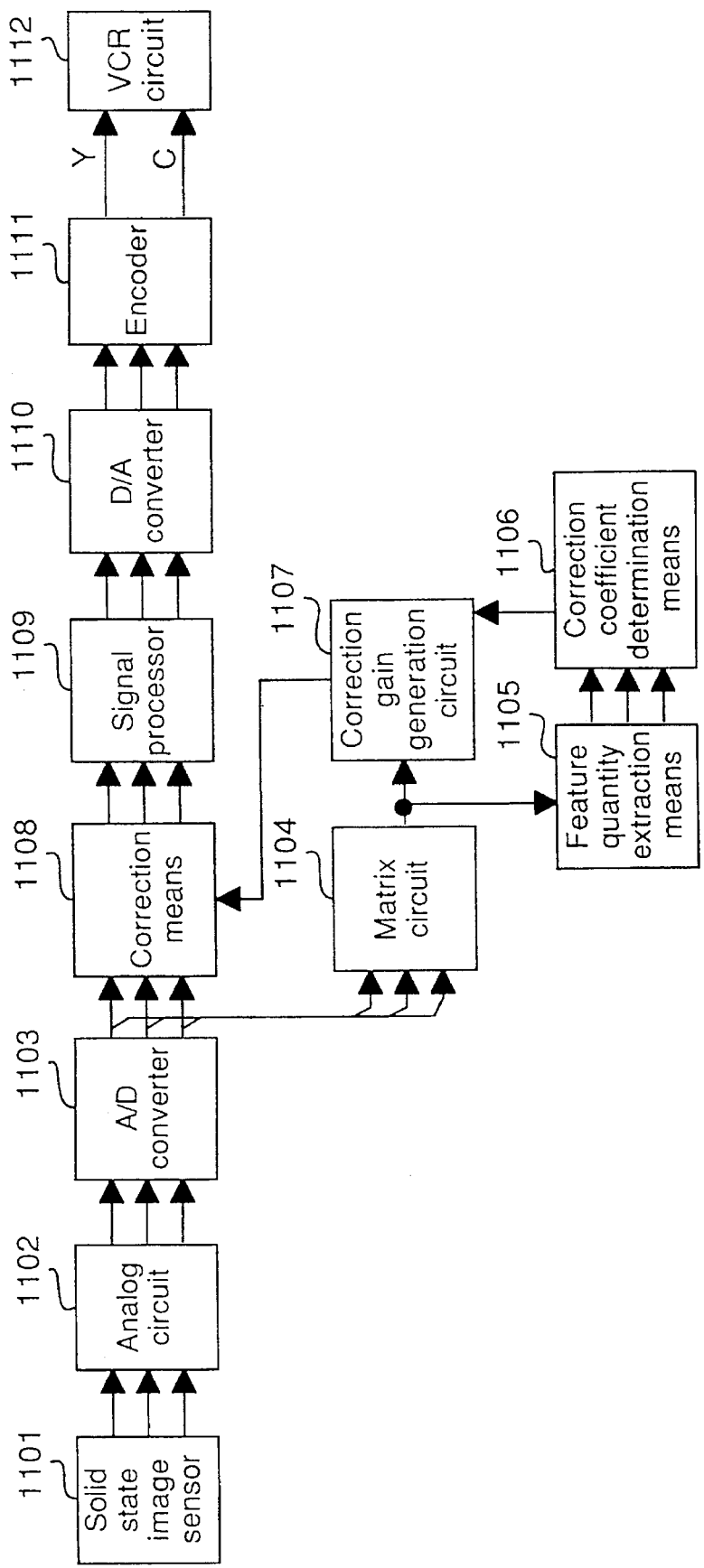
FIG. 17 is a block diagram of the functions of an image sensing device which can correct gradation according to a third embodiment of the present invention.

FIG. 17 shows a block diagram of an image sensing device which can correct gradation according to a third embodiment of the present invention. This device is similar to that of the first embodiment shown in FIG. 1 except that feature extraction and correction determination are carried out by using a software program. First, R, G and B signals as input picture signals are sensed by a solid state image sensor 1101 through an analog circuit 1102. The R, G and B signals are converted by an analog-to-digital converter 1103 to digital data of 0–255, which are supplied as input picture signals to a matrix circuit 1104 and to the gradation correction means 1108. A matrix circuit 1104 calculates a luminance signal Y from the digital R, G and B signals, and it supplies the luminance signal Y to a feature quantity extraction means 1105 for extracting feature quantities and to a correction gain generation means 1107 for generating a correction gain. The feature quantity extraction means 1105 extracts features of pixels of low, middle and high luminance sections of the luminance signal Y and supplies them as feature quantities to a correction coefficient determination means 1106. This means 1106 decides a gradation correction characteristic most appropriate to the input picture signal and sends a gradation correction coefficient characterizing the gradation correction characteristic. A correction gain generation means 1107 outputs a correction gain according to the luminance signal Y and the correction coefficient, and a gradation correction means 1108 multiplies the input picture signals with the correction gain for gradation correction. On the corrected R, G and B signals the signal processor 1109 performs signal processing such as aperture processing. The processed digital R, G and B signals are converted to analog R, G and B signals by a digital-toanalog converter 1110. Next, an encoder 1111 converts the R, G and B signals to Y signal (luminance signal) and C signal (C signal). Finally, a VCR circuit 1112 records them in a video tape.

Figure 18:
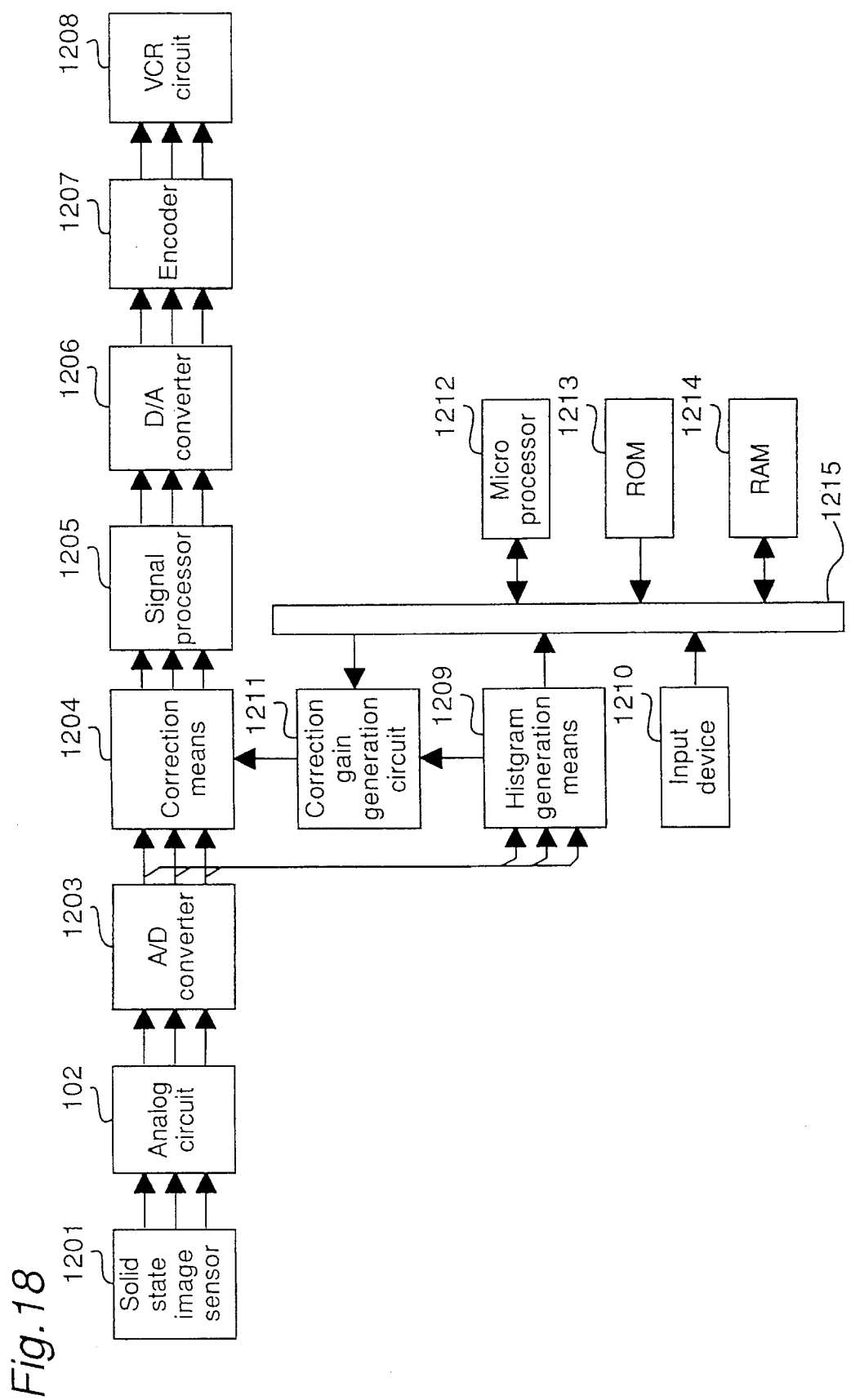
FIG. 18 is a block diagram of the image sensing device which can correct gradation according to a third embodiment of the present invention.

FIG. 18 shows a block diagram of an image sensing device of an example according to a third embodiment of the present invention, wherein a solid state image sensor 1201, an analog circuit 1202, an analog-to-digital (A/D) converter 1203, a gradation correction circuit 1204, a signal processor 1205, a digital-to-analog (D/A) converter 1206, an encoder 1207 and a VCR circuit 1208 are similar to the counterparts shown in FIG. 17. First, R, G and B signals as input picture signals are sensed by the solid state image sensor 1101 through the analog circuit 1202. The R, G and B signals are converted by the analog-to-digital converter 1203 to digital data of 0–255 level, which are supplied as input picture signals to a histogram generation means 1209 and to a gradation correction means 1204. The histogram generation means 1209 calculates a luminance signal Y from the R, G and B signals to generates frequencies of pixels of low, middle and high luminance sections for a 1-frame of an effective picture plane to extract feature quantities. A microprocessor 1212 is connected via a bus 1215 to a ROM 1213, a RAM 1214, an input means 1210 such as a key board and a correction gain generation circuit 1211. The ROM 1213 stores templates which includes features of gradation correction characteristic, while the RAM 1214 stores the numbers of pixels of low, middle and high luminances received from the histogram generation means 1209. The microprocessor 1212 determines a correction coefficient according to a flowchart shown in FIG. 19.

Figure 19:
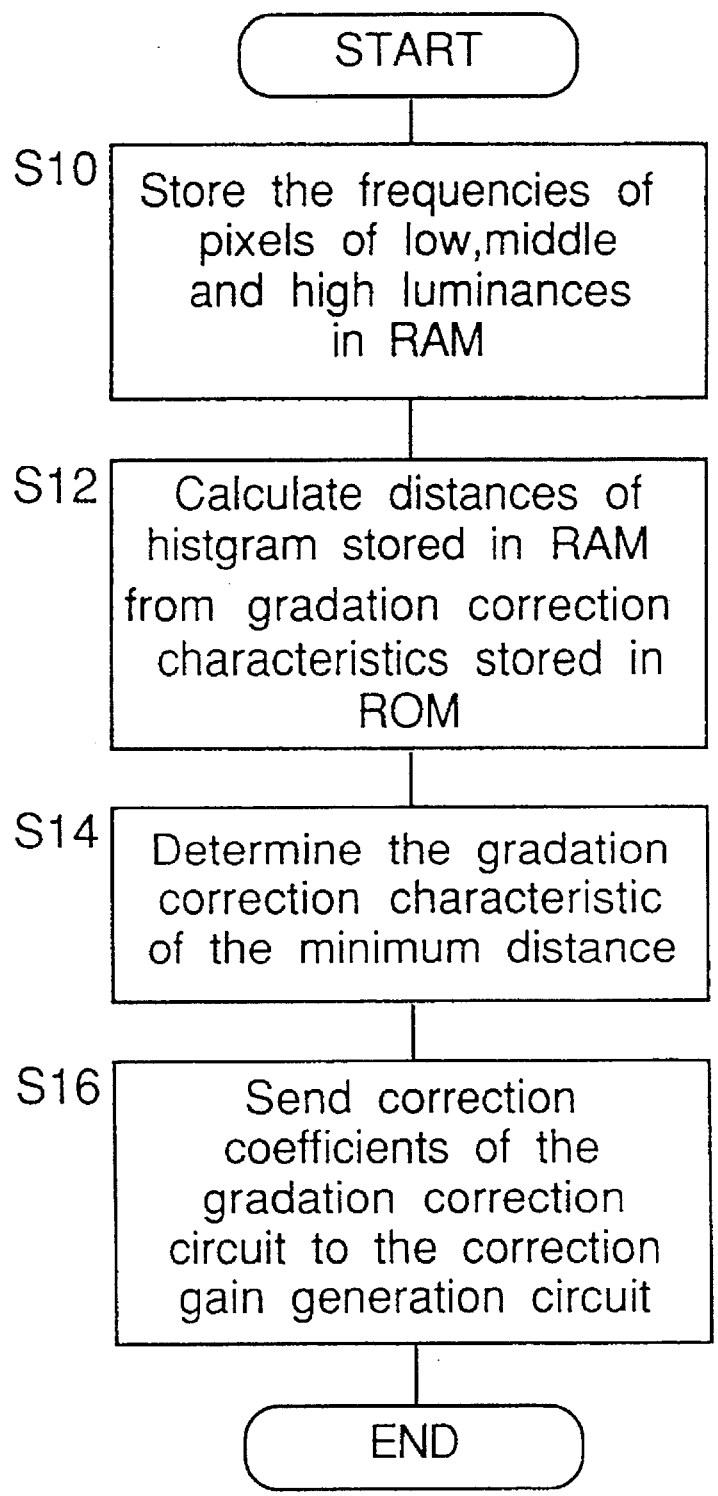
FIG. 19 is a flowchart of a process for determining correction coefficients in the third embodiment of the present invention.

Next, an explanation follows as to how the microprocessor 1212 determines the gradation correction characteristic by using template matching with reference to FIG. 19. First, the frequencies of pixels of low, middle and high luminance sections are read from the histogram generation means 1209 and stored in the RAM 1214 (step S10). Next, the distances of the numbers stored in the RAM 1214 from templates stored in the ROM 1213 are calculated (step S12). The templates represent gradation correction characteristics to be selected according to feature quantities of input picture signals. Next, a gradation correction characteristic of the shortest distance is determined (step S14). Finally, a processing is performed for keeping gradation continuity with the gradation correction characteristic of a previous field. Then, a correction coefficient is sent for the correction gain generation circuit 1211 (step S16).

The correction gain generation circuit 1211 averages the first and second gradation correction characteristics with a weight according to a sum of the average of the input luminance signal and the correction coefficient and supplies a correction gain to the gradation correction circuit 1204. The circuit 1204 adjusts the timing of the R, G and B signals according to the correction gain, and multiplies each of the R, G and B signals with the correction gain to send corrected R, G and B signals after gradation correction. On the corrected R, G and B signals, the signal processor 1205 performs signal processing such as aperture processing. The processed digital R, G and B signals are converted to analog R, G and B signals by the digital-to-analog converter 1206. Next, the encoder 1207 converts the R, G and B signals to Y signal (luminance signal) and C signal (C signal). Finally, the VCR circuit 1208 records them in a video tape.

As in the previous embodiments, the image sensing device according to the present embodiment can provide an output picture of good color balance and rich gradation expression for all objects from back-lit object to front-lit object without deteriorating gradation. Still further, the contrast at high luminance is preserved for a back-lit object. On the other hand, in a prior art so-called auto-knee control, the gradation at high luminance is deteriorated. Preferably, gradation correction is performed in the unit of pixel by changing the gradation correction characteristic according to the average luminance Ya. Then the gradation correction keeps contrast even if the slope of the correction gain is small, and output signals of rich gradation expression can be obtained. When a moving picture is corrected, a natural picture can be provided with use of gradation correction.

Figure 20:
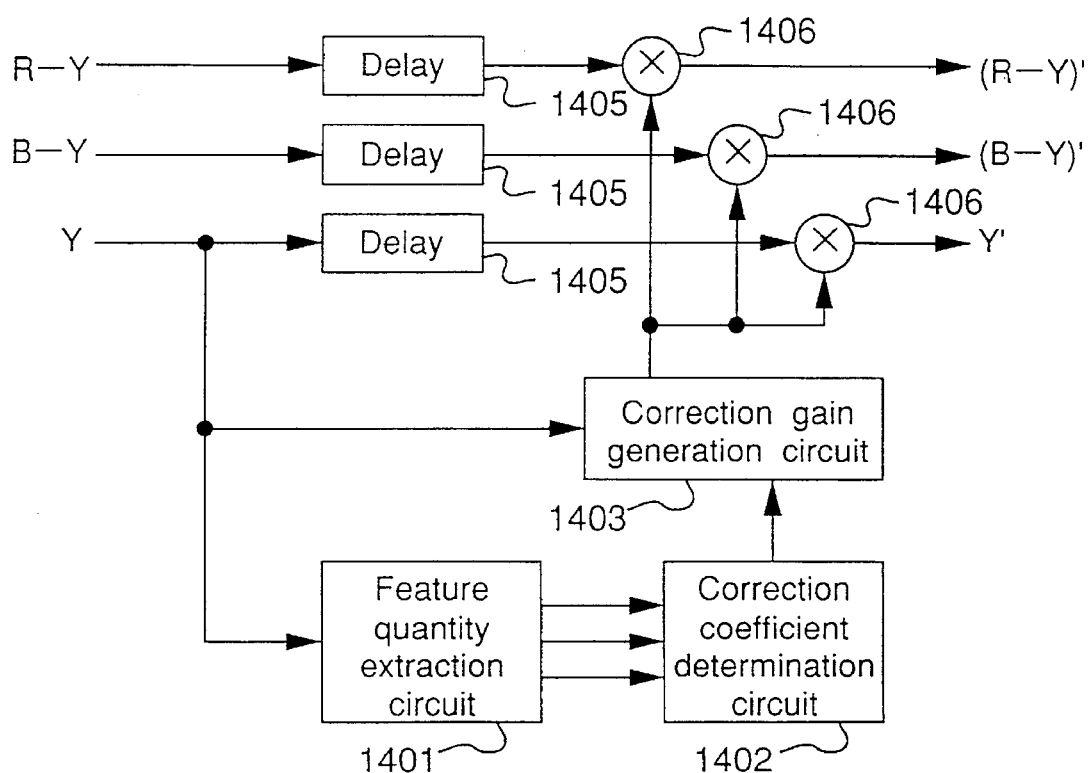
FIG. 20 is a block diagram of a gradation correction circuit according to a fourth embodiment of the present invention.

FIG. 20 shows a block diagram of a gradation correction device according to a fourth embodiment of the present invention. The gradation correction device includes a feature quantity extraction circuit 1401, a correction coefficient determination circuit 1402, a correction gain generation circuit 1403, a correction circuit 1404, delays 1405 and multipliers 1406. This gradation correction device is different from that shown in FIG. 4 in that a matrix circuit has been omitted because input picture signal includes luminance and color signals.

Next, the gradation correction circuit of the fourth embodiment is explained. A luminance signal Y and color difference signals R-Y, B-Y are received by the gradation correction device. Therefore a matrix circuit for calculating luminous signal can be omitted because the luminance signal Y is received. The functions of a feature quantity extraction circuit 1401, a correction coefficient determination circuit 1402, a correction gain generation circuit 1403 and a gradation correction means 1404 are similar to the counterparts in the first embodiment. That is, the luminance signal Y to the feature quantity extraction circuit 1401 and to the correction gain generation circuit 1403. The feature quantity extraction circuit 1401 extracts features of pixels of low, middle and high luminance sections of the luminance signal Y and supplies them to the correction coefficient determination circuit 1402. The circuit 1402 decides a gradation correction characteristic most appropriate to the input picture signals and sends a correction coefficient to the gradation gain generation circuit 1403. The circuit 1403 outputs a correction gain according to the luminance signal Y and the correction coefficient to the correction circuit 1404. Then, in the gradation correction means 1404, the delay circuits 1405 adjust the timings of input picture signals and the multipliers 1406 multiply the picture signals with the correction gain to send corrected luminance signal Y' and color difference signals (R-Y)' and (B-Y)'. As in the previous embodiments, an output picture of good color balance and rich gradation expression can be obtained for all objects from back-lit object to front-lit object without deteriorating gradation.

The above-mentioned embodiments can be varied in many ways. For example, in the above-mentioned embodiments, R, G and B signals or luminance signal and color difference signals are used as input digital picture signals. However, other signals which vary with luminance can also be used as input digital picture signals. Such signals include a composite signal or a signal synthesized from the luminance and color signals.

In the embodiments mentioned above, the correction circuit multiplies each of input picture signals by the correction gain. However, in a modified example, a correction value (Y-Y') is calculated and gradation is corrected by adding the correction value (Y-Y') to each of the input picture signals, instead of the above-mentioned multiplication by the correction gain (Y'/Y). In this case, a correction difference circuit is provided to calculate (Y-Y') instead of the correction gain circuit 104 and adders are used for the addition of (Y-Y') instead of the multipliers 107 provided in the correction circuit 105.

In the embodiments explained above, an input picture signal is converted to an 8-bit digital signal. However, the bit number for quantization may be a number different from eight. The bit number to be processed in the correction gain generation circuit and the like can be adjusted according to the bit number for quantization.

In the embodiments described above, a gradation correction device is provided for gradation correction in a camcorder. Therefore, gradation correction device receives input picture signals from the solid state image sensor 201 through the analog circuit 202. However, a different recording medium can also be used to provide input picture signals: for example, a laser disc, a video tape, a magnetic disc or the like for analog picture recording and a magnetic disc such as a hard disc or an optical disc for a digital recording after analog-to-digital conversion. In other words, input recording signals are supplied from such a recording medium. The gradation correction device of the invention can be applied to any recording medium which stores a 1-frame or a 1-field picture data, wherein the solid state image sensor 201 and the analog circuit 202 can be replaced by an appropriate device.

In the embodiments explained above, the correction coefficient determination circuit decides the correction coefficient of input picture signals according to a luminance histogram. However, other feature quantities which can classify a picture or which reflect luminance level distribution may be used instead of the luminance histogram. For example, each histogram of red (R), green (G) and blue (B) signals, or one of them (say green (G)) can used. Further, if an effective picture area of picture data is divided into a plurality of blocks, a maximum an average, a minimum and the like of luminance signal, R, G and B signals or color difference signals may be extracted in each block. For example, if a picture plane is divided into 4 * 4=16 blocks and a maximum, an average and a minimum in each block are determined, 48 data are extracted from a picture. Then, these data may be used to decide features of the picture.

The correction coefficient determination circuit can use any process for determining an appropriate gradation correction characteristic from input picture signals. For example, a neural network or fuzzy control can be used to determine appropriate gradation correction characteristic besides the above-mentioned template matching.

As explained above, it is an advantage of a gradation correction circuit according to the present invention and of an image sensing device therewith that it can determine a most suitable gradation correction characteristic automatically by deciding a picture according to feature quantities obtained from input picture signals. By using such a simple structure, extreme black or white can be prevented in a reproduced picture, and an output picture of good color balance and rich gradation expression can be obtained for all objects from back-lit object to front-lit object without deteriorating gradation. Further, it is also an advantage of the present invention that because gradation correction characteristic can be changed gradually and continuously, gradation correction can be performed naturally even for a moving picture.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A gradation correction device comprising:

a feature quantity extractor, said feature quantity extractor extracting feature quantities from input digital picture signals of a picture, the feature quantities reflecting aluminance level distribution of the input digital picture signals;

a correction coefficient determinator, said correction coefficient determinator generating a correction coefficient which determines a gradation correction characteristic based on the feature quantities received from the feature quantity extractor, the gradation correction characteristic defining an output signal for an input signal;

a gain generator, said gain generator generating a correction gain which changes with a signal level of an input digital luminance signal according to the luminance signal and the correction coefficient received from said correction coefficient determinator; and a corrector, said corrector correcting each of the input digital picture signals by multiplying each of the input digital picture signals by the correction gain generated by said gain generator.

2. The gradation correction device according to claim 1, wherein said input picture signals comprise a luminance signal and color difference signals.

3. The gradation correction device according to claim 1, further comprising a luminance signal generator, said luminance signal generator separating or synthesizing the luminance signal from the input digital picture signals.

4. The gradation correction device according to claim 3, wherein said luminance signal generator comprises a matrix circuit for generating the luminance signal from R, G and B signals.

5. The gradation correction device according to claim 1, wherein said feature quantity extractor determines the luminance level distribution by calculating a histogram of the luminance signals of the picture, the luminance signals being classified into a plurality of sections, frequency values of the sections being used as said feature quantities.

6. The gradation correction device according to claim 5, wherein said plurality of sections comprise three sections.

7. The gradation correction device according to claim 1, wherein said correction coefficient determinator determines a gradation correction characteristic by averaging two prescribed gradation correction characteristic with a weight determined according to the feature quantities received from said feature quantity extractor.

8. The gradation correction device according to claim 1, said correction coefficient determinator comprising:

quantizer, said quantizer for quantizing the feature quantities received from said feature quantity extractor; and a table, said table providing a correction coefficient to determine the gradation correction characteristic according to quantized values quantized by said quantizer.

9. The gradation correction circuit according to claim 8, said correction coefficient determinator further comprising:

a memory, said memory for storing a correction coefficient in a previous picture;

a counter, said counter counting a number of successive pictures where the correction coefficient received from said table is successively greater than or successively less than the correction coefficient stored in said memory; and an updater, said updater determining the correction coefficient to be sent to said corrector according to the number of successive pictures received from said counter.

10. The gradation correction circuit according to claim 8, said correction coefficient determinator further comprising:

a memory, said memory storing a correction coefficient in a previous picture; and an updater, said updater determining the correction coefficient to be sent to said corrector according to a difference between the correction coefficient received from said table and the correction coefficient stored in the memory.

11. The gradation correction device according to claim 1, said gain generator comprising:

a first generator, said first generator generating a first output value of a first gradation correction characteristic for an input digital picture signal;

a second generator, said second generator generating a second output value of a second gradation correction characteristic for the input digital picture signal;

an adder, said adder adding the input digital picture signal and the correction coefficient determined by said correction coefficient determinator to provide a weight; and a weighted averager, said weighted averager determining the correction gain by averaging the first and second output values by the weight.

12. The gradation correction device according to claim 1, said gain generator comprising:

a first generator, said first generator generating an output value of a first gradation correction characteristic for an input digital picture signal;

a second generator, said second generator generating an output value of a second gradation correction characteristic for the input digital picture signal;

an averager, said averager obtaining an average of input digital picture signals including the input digital picture signal and those thereabout;

an adder, said adder adding the average received from the averager and the correction coefficient determined by said correction coefficient determinator to provide a weight; and a weighted averager, said weighted averager determining the correction gain by averaging the two output values by the weight.

13. The gradation correction circuit according to claim 11, wherein said first gradation characteristic Y1 of the input picture signal Y changes according to a following cubic equation:

$$Y1=\{(1/a^2*(Y-a)^3+a\},$$

wherein "a" is a constant, and said second gradation characteristic Y2 changes according to a following linear equation:

$$Y2=b*Y,$$

wherein "b" is a constant.

14. The gradation correction circuit according to claim 12, wherein said first gradation characteristic Y1 changes with the input picture signal Y according to a following cubic equation:

$$Y1=\{(1/a^2*(Y-a)^3+a\},$$

wherein "a" is a constant, and said second gradation characteristic Y2 changes with the input picture signal Y according to a following linear equation:

$$Y2=b*Y,$$

wherein "b" is a constant.

15. The gradation correction circuit according to claim 1, said gain generator comprising:

an average detection circuit for obtaining an average Ya of an input picture signal Y and input digital picture signals thereabout;

a first adder for adding the average Ya with said correction coefficient;

a clip circuit for clipping an output signal of the first adder with a value "0" and a maximum level of the input picture signal Y;

a second adder for adding the input picture signal Y to provide 3Y;

a first multiplier for multiplying the input picture signal Y two times to provide $Y^2$;

a third adder for adding an output signal of the first multiplier to a constant;

a first subtractor for subtracting an output signal of the second adder from an output signal of the third adder;

a second subtractor for subtracting an output signal of the clip circuit from the maximum level of the input picture signal;

a second multiplier for multiplying an output signal of the first subtractor by an output signal of the second subtractor; and a fourth adder for adding an output signal of the clip circuit with an output signal of the second multiplier to provide the correction gain.

16. The gradation correction device according to claim 1, said corrector comprising:

a correction difference generator, said correction difference generator generating a correction difference of a corrected signal from the input digital picture signals, the corrected signal being calculated according to the input digital picture signals and the correction coefficient determined by said correction coefficient determinator; and an adder for adding the input digital picture signals with the correction difference received from the correction difference generator.

17. An image sensing device comprising:

an image sensor, said image sensor detecting input picture signals of a picture and providing input digital picture signals;

a feature quantity extractor, said feature quantity extractor for extracting feature quantities from the input digital picture signals of a picture, the feature quantities reflecting luminance level distribution of the input picture digital signals;

a correction coefficient determinator, said correction coefficient determinator generating a correction coefficient which determines a gradation correction characteristic based on the feature quantities received from the feature quantity extractor, said gradation correction characteristic defining an output signal for an input signal;

a gain generator, said gain generator generating a correction gain which changes with a signal level of an input digital luminance signal according to the luminance signal and the correction coefficient received from said correction coefficient determinator; and a corrector, said corrector correcting each of the input picture signals by multiplying each of the input digital picture signals by the correction gain generated by said gain generator.

18. The image sensing device according to claim 17, further comprising a recorder, said recorder recording the corrected picture signals of the picture on an external recording medium.

19. A gradation correction device comprising:
- a feature quantity extraction means for extracting feature quantities from input digital picture signals of a picture, said feature quantities reflecting luminance level distribution of the input digital picture signals;
- a gradation correction characteristic determination means for determining a gradation correction characteristic based on the feature quantities received from the feature quantity extraction means, said gradation correction characteristic defining an output signal for an input signal; and
- a correction means for correcting each of the input digital picture signals by using the gradation correction characteristic determined by the gradation correction characteristic determination means;
- whereby the gradation correction characteristic for the input picture digital signals is varied according to features thereof;
- said correction means comprising:
  - a correction gain generation means for generating a correction gain for the input digital picture signals according to the input digital picture signals and the correction coefficient determined by said gradation correction characteristic determination means; and
  - a multiplication means for multiplying the input digital picture signals with the correction gain received from the correction gain generation means.

20. The gradation correction device according to claim 19, said correction gain generation means comprising:
- a first means for generating a first output value of a first gradation correction characteristic for an input digital picture signal;
- a second means for generating a second output value of a second gradation correction characteristic for the input digital picture signal;
- an adder means for adding the input digital picture signal and the correction coefficient determined by said gradation correction characteristic determination means to provide a weight; and
- a weighted average means for determining the correction gain by averaging the first and second output values with the weight.

21. The gradation correction device according to claim 19, said correction gain generation means comprising:
- a first means for generating an output value of a first gradation correction characteristic for an input digital picture signal;
- a second means for generating an output value of a second gradation correction characteristic for the input digital picture signal;
- an average means for obtaining an average of input digital picture signals including the input digital picture signal and those thereabout;
- an adder means for adding the average received from the average means and the correction coefficient determined by said gradation correction characteristic determination means to provide a weight; and
- a weighted average means for determining the correction gain by averaging the two output values with the weight.

22. The gradation correction circuit according to claim 20, wherein said first gradation characteristic Y1 of the input picture signal Y changes according to a following cubic equation:

$$Y1 = \{(1/a^2 * (Y-a)^3 + a\},$$

wherein "a" is a constant, and said second gradation characteristic Y2 changes according to a following linear equation:

$$Y2 = b*Y,$$

wherein "b" is a constant.

23. The gradation correction circuit according to claim 21, wherein said first gradation characteristic Y1 changes with the input picture signal Y according to a following cubic equation:

$$Y1 = \{(1/a^2 * (Y-a)^3 + a\},$$

wherein "a" is a constant, and said second gradation characteristic Y2 changes with the input picture signal Y according to a following linear equation:

$$Y2 = b*Y,$$

wherein "b" is a constant.

24. The gradation correction circuit according to claim 19, said correction gain generation means comprising:
- an average detection circuit for obtaining an average Ya of an input picture signal Y and input digital picture signals thereabout;
- a first adder for adding the average Ya with said correction coefficient;
- a clip circuit for clipping an output signal of the first adder with a value "0" and a maximum level of the input picture signal Y;
- a second adder for adding the input picture signal Y to provide 3Y;
- a first multiplier for multiplying the input picture signal Y two times to provide $Y^2$;
- a third adder for adding an output signal of the first multiplier to a constant;
- a first subtractor for subtracting an output signal of the second adder from an output signal of the third adder;
- a second subtractor for subtracting an output signal of the clip circuit from the maximum level of the input picture signal;
- a second multiplier for multiplying an output signal of the first subtractor with an output signal of the second subtractor; and
- a fourth adder for adding an output signal of the clip circuit with an output signal of the second multiplier to provide the correction gain.

* * * * *